United States Patent [19]
Ueno et al.

[11] Patent Number: 5,440,974
[45] Date of Patent: Aug. 15, 1995

[54] CROISSANT DOUGH-PIECE BENDING APPARATUS

[75] Inventors: Sadao Ueno; Hitoshi Kuwahara; Michio Morikawa, all of Utsunomiya, Japan

[73] Assignee: Rheon Automatic Machinery Co., Ltd., Tochigi, Japan

[21] Appl. No.: 319,260

[22] Filed: Oct. 6, 1994

[30] Foreign Application Priority Data

Oct. 8, 1993 [JP] Japan .................. 5-277584

[51] Int. Cl.⁶ .................. A21C 3/00; A21D 6/00; A23P 1/00
[52] U.S. Cl. .................. 99/450.2; 99/450.1; 425/321; 425/325; 425/329; 425/391
[58] Field of Search .................. 99/450.1, 450.2, 450.6, 99/353; 425/112, 319, 115, 320, 321–322, 334, 335, 371, 329, 372, 337, 391, 397, 162, 400; 426/500–503, 512; 198/456, 345.1; 264/285, 281

[56] References Cited

.U.S. PATENT DOCUMENTS

| | | | |
|---|---|---|---|
| 4,036,569 | 7/1977 | Oshikiri | 425/140 |
| 4,582,472 | 4/1986 | Hanson | 425/391 X |
| 5,018,439 | 5/1991 | Bordin | 99/450.2 |
| 5,078,585 | 1/1992 | Morikawa et al. | 425/321 |
| 5,169,664 | 12/1992 | Ueno et al. | 426/503 |

*Primary Examiner*—Timothy F. Simone
*Attorney, Agent, or Firm*—Limbach & Limbach; W. Patrick Bengtsson

[57] ABSTRACT

The present invention provides a croissant dough-piece bending apparatus having a conveyor for conveying rolled-up croissant dough pieces, a dough-piece bending member to push the central portion of the dough piece downstream, and a pair of swingable dough-piece bending belts. The dough-piece is pushed by the dough-piece bending member toward and between the dough-piece bending-belts. The dough piece is correctly bent at its center by the cooperation of the bending-member and the bending-belts. By this invention the dough pieces can be bent without getting wrinkles on their surfaces, and symmetrically bent products of a uniform shape can be obtained.

2 Claims, 3 Drawing Sheets

FIG. I

CROISSANT DOUGH-PIECE BENDING APPARATUS

FIELD OF THE INVENTION

The present invention relates to the art of bending a fusiform bread dough piece for instance a rolled-up croissant dough piece, at its center portion while it is conveyed, before conveying it to downstream processing stations.

DESCRIPTION OF THE RELATED ART

Conventional croissants are generally curved or bent, and to obtain the products of such a shape many forming apparatuses have been developed. For instance, Netherlands Patent Application No. 8800402 and German Patent Application No. P4039793.9 disclose the art of bending a rolled-up croissant dough pieces from both its ends.

According to the prior art, the structure of dough-piece bending machines is complex and it is not easy to bend a croissant dough piece precisely at its center. Thus the dough pieces so bent took an asymmetric form so that they provided low-quality products.

SUMMARY OF THE INVENTION

As opposed to the prior art, in the present invention the croissant dough pieces can be correctly bent at their center while they are conveyed. Namely, the present invention provides a croissant dough-piece bending apparatus comprising: a conveyor for conveying rolled-up croissant dough pieces; and a dough-piece bending member to push the dough piece in the direction of its movement on the conveyor between a pair of dough-piece bending belts provided on the conveyor downstream of the bending member; the pair of dough-piece bending belts being located symmetrically relative to the dough-piece moving line on the conveyor, the opposite surfaces of the bending-belts converging toward the dough-piece moving line in the downstream direction, the bending-belts being adapted to swing about their downstream ends toward and away from each other so that the dough-piece is bent at its center in cooperation with the movement of the dough-piece bending member.

In one embodiment of the invention the dough-piece bending-member has a roller having flanges at its sides to form grooves on the surface of the dough piece.

DESCRIPTION OF THE PREFERRED EMBODIMENT

Figure 1:
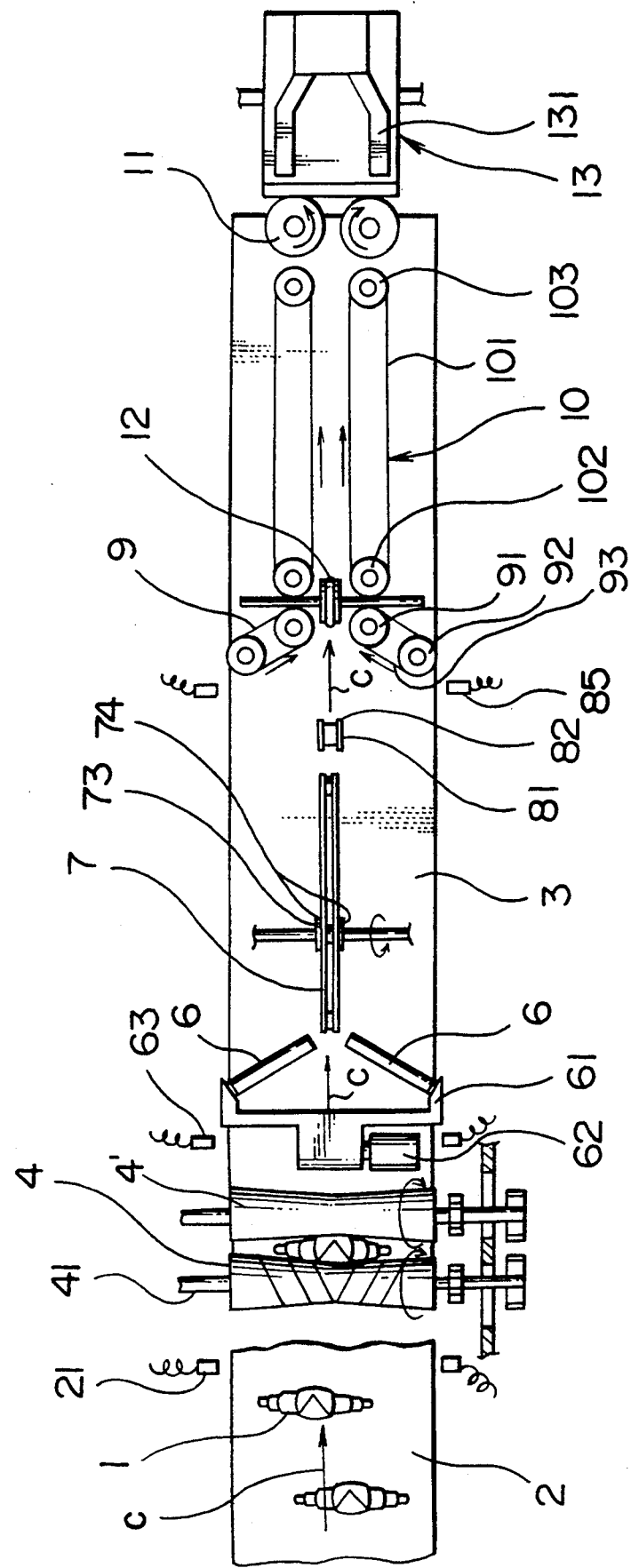
FIG. 1 is an overall view of a dough-piece bending machine that includes the dough-piece bending apparatus of the present invention.
Figure 2:
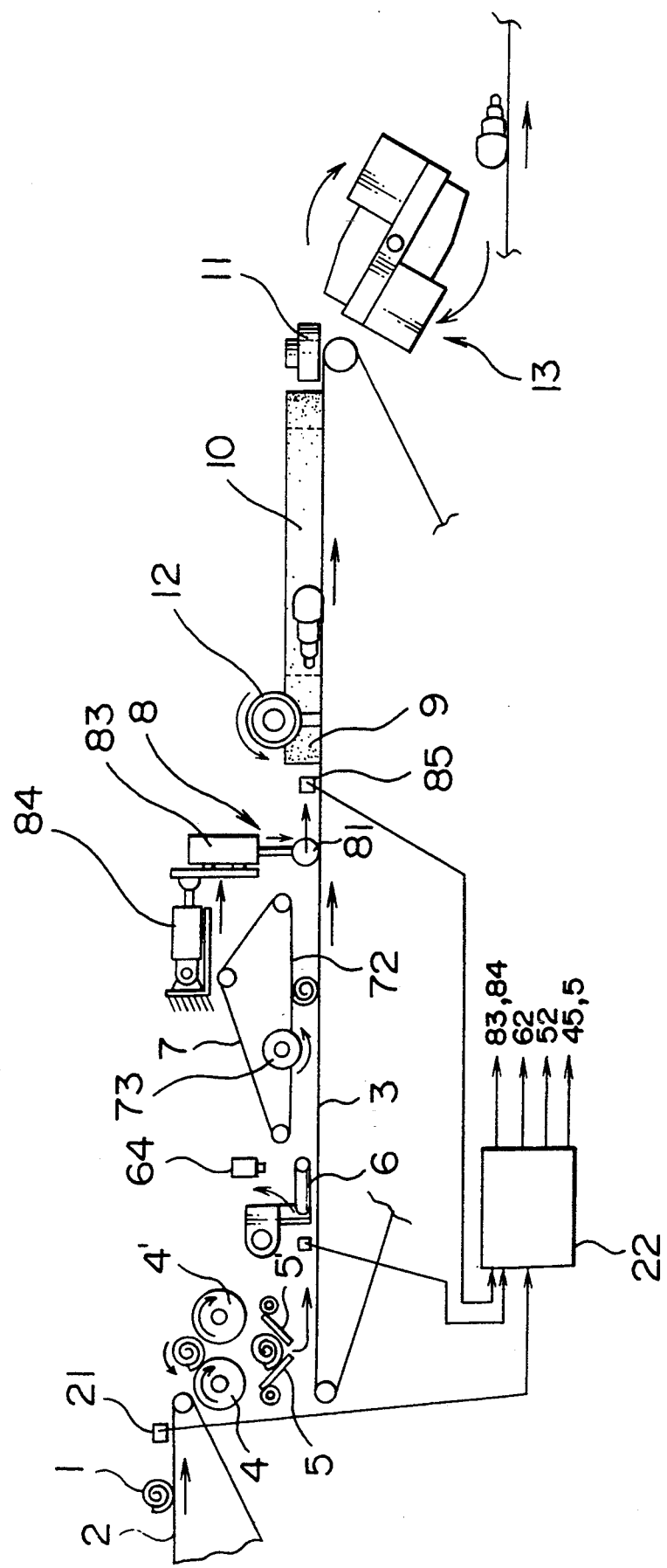
FIG. 2 is an overall side view of the machine shown in FIG. 1.
Figure 3:
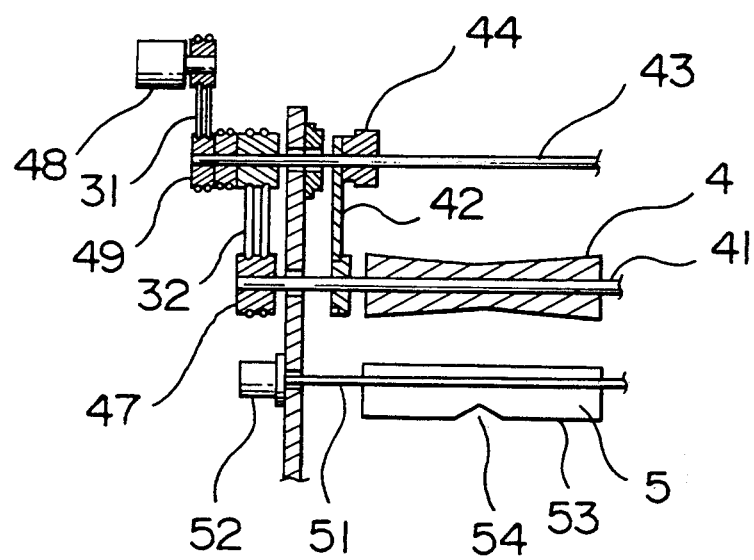
FIG. 3 is a front sectional view of the center-aligning apparatus.
Figure 4:
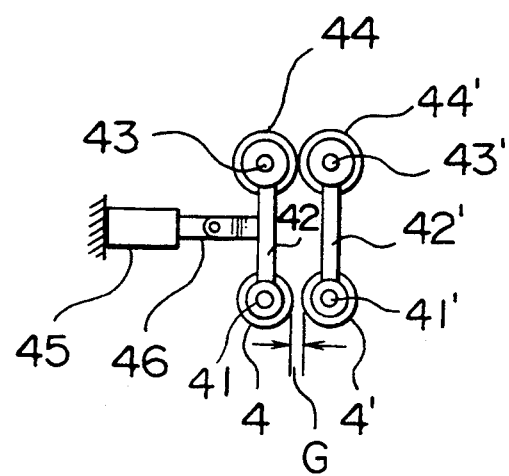
FIG. 4 is a partial side view of the apparatus shown in FIG. 3.

An embodiment of the present invention will now be described with reference to FIGS. 1-4. The croissant dough-piece bending apparatus comprises a conveyor 3 to convey rolled-up croissant dough piece 1. An additional conveyor 2, a dough-piece supplying conveyor, is located upstream of and above the conveyor 3. A center-aligning apparatus for croissant dough pieces is located adjacent the downstream end of the additional upstream conveyor 2 and between the two conveyors 2, 3. The center-aligning apparatus has a pair of concave rollers 4, 4' and a pair of shutters 5, 5'. The apparatus serves to align the center of the croissant dough piece supplied from the upstream conveyor 2 and deposit it on the conveyor 3 to facilitate bending of the dough-piece 1 at its center in the subsequent line as explained below.

To further align the center of the croissant dough piece 1, a pair of freely-rotatable inclined rollers 6 may be provided on the conveyor 3.

Dough-piece holding belts 7 are provided adjacent to and downstream of the inclined rollers 6. The dough-piece holding belts 7 consist of two thin endless belts, which are trained in parallel relationship. The speed of the dough-piece bending belts 7 is the same as the conveying speed of the conveyor 3.

The dough-piece bending apparatus of the present invention comprises, in addition to the conveyor 3, a dough-piece bending member 8 and a pair of dough-piece bending belts 9. The bending member 8 includes: a roller 81 having flanges 82 at each side of it, an air cylinder 83 for lowering the roller 81 toward the conveyor, and an air cylinder 84 for moving the frame that supports the air cylinder 83 in the same direction as that of the movement of the conveyor 3. A photoelectric tube 85 is provided to sense the passage of the croissant dough piece 1.

In this structure, when the roller 81 receives a signal from the photoelectric tube 85, the roller 81 pushes the croissant dough piece 1 in the direction of its movement into the space between bending belts 9, which are located downstream of the roller 81.

The bending belts 9 consist of endless belts 93 each trained around a drive roller 91 and an idler roller 92. The belts 9 are positioned on the conveyor 3 so that they converge in the downstream direction and they are adapted to swing toward and away from each other. Namely, each of the outer portions of the endless belts 93, which are normally positioned adjacent the longitudinal edge of the conveyor 3, can rotate about the shaft of the drive roller 91 inwardly toward the central line C of the conveyor 3.

The rolled-up croissant dough piece 1 is conveyed from the upstream conveyor 2 through the center-aligning apparatus, i.e., the pair of concave rollers 4, 4' and the pair of shutters onto the conveyor 3. The center-aligned dough piece is then fed past the inclined rollers 6 and further carried by the holding belts 7 to the bending member 8.

When the croissant dough piece 1 reaches the bending belts 9, its position is sensed by the photoelectric tubes 85, and the signal from the tube actuates the air cylinders 83, 84 to operate the bending member 8. As the air cylinders 83, 84 are operated, the roller 81 pushes the dough-piece in the direction of its movement. Namely, the roller pushes the central thick portion of the dough piece into the space between the bending belts 9 and simultaneously the outer portions of the bending belts 9 are swung inwardly toward the central line C of the conveyor 3. By these movements of the roller 81 and the bending belts 9, the dough piece is bent at its center. Since this bending operation is continuously carried out on the conveyor 3 along the center line C, wrinkles will not appear on the croissant dough piece 1, because there is no friction between the downstream conveyor and the dough piece.

The croissant dough piece thus bent is carried downstream into a path between the gripping belts 10 by the infeed roller 12 to be discharged from the conveyor.

As explained above, according to the present invention, a croissant dough-piece bending apparatus is provided which comprises a conveyor for conveying rolled-up croissant dough pieces; and a dough-piece bending member for pushing the dough piece in the direction of its movement between a pair of the bending belts; the pair of croissant-dough bending belts being located downstream of the bending member and symmetrically relative to the control line of the conveyor. Since the croissant dough piece is bent while it is conveyed, it can be bent without getting wrinkles on its surface.

Further, the dough-piece bending roller has flanges at each side to form grooves on the dough piece's surface to assist in bending the dough piece at its center.

According to the present invention, the croissant dough piece can be bent correctly at its center to produce symmetrically-bent dough piece having a uniform shape.

What is claimed is:

1. A croissant dough-piece bending apparatus comprising:
   a conveyor for conveying rolled-up croissant dough pieces; and
   a dough-piece bending member to push the dough piece in the direction of its movement on the conveyor between a pair of dough-piece bending belts provided on the conveyor downstream of the bending member;
   the pair of dough-piece bending belts being located symmetrically relative to the conveyor, the opposite surfaces of the bending belts converging toward each other in the downstream direction, the dough-piece bending belts being adapted to swing about their downstream ends toward and away from each other so that the dough piece is bent at its center in cooperation with the movement of the dough-piece bending member.

2. A dough-piece bending apparatus according to claim 1, wherein the dough-piece bending member has a roller having flanges on both sides to form bending grooves on the surface of the dough-piece.

* * * * *